US012365011B2

(12) United States Patent
Jaeck et al.

(10) Patent No.: US 12,365,011 B2

(45) Date of Patent: Jul. 22, 2025

(54) SLAT CLEANING APPARATUS

(71) Applicant: SANI-MATIC Inc., Sun Prairie, WI (US)

(72) Inventors: Justin M. Jaeck, Sun Prairie, WI (US); Andrew C. Jones, Sun Prairie, WI (US); Justin M. Marx, Sun Prairie, WI (US); Nicole L. Schoenbeck-Claas, Sun Prairie, WI (US); Tou T. Vang, Sun Prairie, WI (US); Solo Yang, Sun Prairie, WI (US)

(73) Assignee: SANI-MATIC, INC., Sun Prairie, WI (US)

( * ) Notice: Subject to any disclaimer, the term of this patent is extended or adjusted under 35 U.S.C. 154(b) by 295 days.

(21) Appl. No.: 17/810,925

(22) Filed: Jul. 6, 2022

(65) Prior Publication Data

US 2024/0009713 A1 Jan. 11, 2024

(51) Int. Cl.

*B08B 3/02* (2006.01)

*B08B 13/00* (2006.01)

(52) U.S. Cl.

CPC .............. *B08B 3/022* (2013.01); *B08B 13/00* (2013.01)

(58) Field of Classification Search

CPC ......... B08B 3/022; B08B 13/00; B08B 9/205; B08B 9/34; B08B 3/02; B08B 1/32;

(Continued)

(56) References Cited

U.S. PATENT DOCUMENTS 2,273,514 A * 2/1942 Chamberlin .............. A47L 4/00 15/220.3

2,279,691 A * 4/1942 Long ......................... A47L 4/00 134/96.1

(Continued)

FOREIGN PATENT DOCUMENTS

GB 2341600 A * 3/2000 ............. B65B 35/08

GB 2341600 A1 3/2000

(Continued)

OTHER PUBLICATIONS https:/www.betterengineering.com/sanitization-washers/; Sanitization Washers | Better Engineering—Aqueous Washing Technology; published Dec. 31, 2021.

(Continued)

*Primary Examiner* — David G Cormier

*Assistant Examiner* — Thomas Bucci

(74) *Attorney, Agent, or Firm* — Harris Beach Murtha Cullina, PLLC

(57) ABSTRACT

A slat cleaning apparatus is provided that includes a rack frame having a support base, a first slat guide having a first upper track, a first lower track, and a first guide step, and a second slat guide having a second upper track, a second lower track, and a second guide step, wherein the first slat guide and the second slat guide are spaced apart and secured to the support base. The slat cleaning apparatus further includes a rack carousel having a plurality of carousel plates aligned and secured together about a common axis extending through a carousel drive shaft, wherein the carousel drive shaft is coupled to the support base to allow the carousel to rotate about the common axis relative to the support base, a plurality of first and second slat pins extending radially outward from respective first and second rim surfaces of the carousel.

11 Claims, 8 Drawing Sheets

(58) Field of Classification Search

CPC .. B08B 9/083; B08B 9/32; B08B 3/04; B08B 9/26; B08B 11/00; B65B 43/50; B65B 55/24; B65B 5/103; B65B 39/007; B65B 57/20; B65B 37/08; B65B 5/101; B65B 35/26; B65B 1/14; B65B 35/46; B65B 1/10; B65B 35/405; A47L 4/00; A47L 4/04

USPC .......................................................... 134/133

See application file for complete search history.

(56) References Cited

U.S. PATENT DOCUMENTS

| | | | | | |
|---|---|---|---|---|---|
| 2,282,628 | A * | 5/1942 | Whann | A47L 4/00 | 118/316 |
| 2,313,606 | A * | 3/1943 | Webb et al. | B08B 1/20 | 15/220.3 |
| 2,472,155 | A * | 6/1949 | Gaino | A47L 4/00 | 15/180 |
| 2,696,216 | A * | 12/1954 | Meyer | A47L 4/00 | 134/155 |
| 2,808,843 | A * | 10/1957 | McTaggart | A47L 4/00 | 134/159 |
| 2,933,746 | A * | 4/1960 | Frand | A47L 4/00 | 15/4 |
| 3,643,277 | A * | 2/1972 | Durst | A47L 4/00 | 15/77 |
| 3,925,960 | A * | 12/1975 | Saari | B65B 37/005 | 53/167 |
| 4,017,003 | A * | 4/1977 | Heino | B65G 47/34 | 221/233 |
| 4,094,129 | A * | 6/1978 | List | B65B 57/20 | 221/9 |
| 4,126,219 | A * | 11/1978 | Bross | B65G 47/1492 | 198/384 |
| 4,185,734 | A * | 1/1980 | Bross | B65G 17/32 | 198/803.14 |
| 4,408,295 | A * | 10/1983 | Kavage | B07C 5/3404 | 53/494 |
| 4,483,435 | A * | 11/1984 | Ionescu | B08B 9/30 | 198/399 |
| 4,730,360 | A * | 3/1988 | Brugelmann | A47L 4/00 | 15/77 |
| 5,062,438 | A * | 11/1991 | Micheletti | A47L 4/00 | 134/29 |
| 5,189,936 | A * | 3/1993 | Gerber | B26D 7/20 | 83/451 |
| 5,632,915 | A * | 5/1997 | Schnetzer | B23K 26/702 | 198/689.1 |
| 5,988,364 | A * | 11/1999 | Boyce | F16B 21/165 | 24/453 |
| 5,996,768 | A * | 12/1999 | Boyce | B65G 47/1471 | 198/397.03 |
| 6,422,418 | B1 * | 7/2002 | Collins | B07C 3/082 | 221/253 |
| 6,505,460 | B2 | 1/2003 | Aylward | | |
| 6,676,863 | B2 | 1/2004 | Christiaens et al. | | |
| 7,252,102 | B1 * | 8/2007 | Grass | B08B 3/06 | 134/201 |
| 8,146,331 | B2 * | 4/2012 | Soloman | B65B 57/18 | 53/151 |
| 9,022,047 | B2 * | 5/2015 | Cantrell | B08B 3/10 | 134/158 |
| 11,014,695 | B2 | 5/2021 | Hansen et al. | | |
| 11,154,627 | B2 | 10/2021 | Greenfield | | |
| 2004/0011806 | A1 | 1/2004 | Luciano et al. | | |
| 2004/0052702 | A1 | 3/2004 | Shuman et al. | | |
| 2010/0175352 | A1 * | 7/2010 | Soloman | B65B 5/103 | 53/235 |

FOREIGN PATENT DOCUMENTS

| | | | | |
|---|---|---|---|---|
| WO | WO-2008092157 | A2 * | 7/2008 | A47L 15/00 |
| WO | WO2010053370 | A3 | 7/2010 | |

OTHER PUBLICATIONS betterengineeringblog.blogspot.com/2014/03/pill-slat-washer-for-pharmaceutical.html; Parts Cleaning News from Better Engineering Mfg., Inc.: Pharmaceutical Washer to Clean Pill Slats (betterengineeringblog.blogspot.com); published Mar. 19, 2014.

https://www.pharmaceutical-tech.com/products/integrated-packaging-systems/slat-washers Published at least by Feb. 24, 2022.

* cited by examiner

SLAT CLEANING APPARATUS

FIELD OF THE INVENTION

This invention relates generally to cleaning apparatuses.

BACKGROUND

Various production facilities utilize machinery and components that require periodic cleaning. Various types of Clean-In-Place (CIP) systems are available for washing and sanitizing components used in production, with the general operation of these machines being well known, including the use of PLC controlled motors, servos, switches, valves, etc. to provide timed wash, rinse, and sanitation cycles using liquid dispensing jets aimed at the components.

Although various CIP system exist, due to everchanging production and manufacturing component designs (shape, size, etc.), such systems can suffer reduced effectiveness and therefore fail to properly clean and dry these components.

SUMMARY OF THE INVENTION

In at least some embodiments, a slat cleaning apparatus is provided that includes: a rack frame comprising: a support base; a first slat guide having a curved first guide upper surface forming a first upper track and a first lower track, the first lower track transitioning to the first upper track via a first guide step; and a second slat guide having a curved second guide upper surface forming a second upper track and a second lower track, the second lower track transitioning to the second upper track via a second guide step, wherein the first slat guide and the second slat guide are spaced apart and secured to the support base. The slat cleaning apparatus further comprising: a rack carousel that includes: a plurality of circular carousel plates aligned and secured together about a common axis extending through a carousel drive shaft, wherein the carousel drive shaft is coupled to the support base to allow the plurality of circular carousel plates to rotate about the common axis relative to the support base, wherein the plurality of substantially circular carousel plates includes at least a first carousel plate and a second carousel plate; a plurality of first slat pins extending radially outward from a first outer rim surface of the first carousel plate; and a plurality of second slat pins extending radially outward from a second outer rim surface of the second carousel plate.

In at least some other embodiments, a slat cleaning apparatus is provided that includes: a rack frame comprising: a support base; a first slat guide having a first upper track and a first lower track, the first lower track transitioning to the first upper track via a first guide step; and a second slat guide having a second upper track and a second lower track, the second lower track transitioning to the second upper track via a second guide step, wherein the first slat guide and the second slat guide are spaced apart and secured to the support base. The slat cleaning apparatus further comprising: a rack carousel that includes: a plurality of carousel plates aligned and secured together about a common axis extending through a carousel drive shaft, wherein the rack carousel is coupled to the support base to allow the plurality of carousel plates to rotate about the common axis relative to the support base; a plurality of first slat pins extending radially outward from a first outer rim surface of the carousel; and a plurality of second slat pins extending radially outward from a second outer rim surface of the carousel.

In at least yet some other embodiments, a method of removing residual liquid is provided that includes: placing slats on slat pins extending radially from outer rim surfaces of carousel plates situated about opposing sides of a circular carousel while selectively rotating the carousel; continuing rotation of the carousel engaging slats with opposing upper tracks extending from opposing slat guides secured to a rack frame rotatably supporting the carousel; continuing rotation of the carousel allowing each slat to progressively fall off the upper tracks at guide steps striking lower tracks extending along the slat guides; continuing rotation of the carousel to move the slats along the lower tracks causing them to be pushed back towards the outer rim surface by curvature of the lower tracks; and continuing rotation of the carousel to move the slats away from the lower tracks and allow the slats rest on outer rim surfaces of the carousel plates.

Other embodiments, aspects, and features of the slat cleaning apparatus will be understood and appreciated upon a full reading of the detailed description and the claims that follow.

BRIEF DESCRIPTION OF THE DRAWINGS

Embodiments of the slat cleaning apparatus are disclosed with reference to the accompanying drawings and are for illustrative purposes only. The slat cleaning apparatus is not limited in its application to the details of construction or the arrangement of the components illustrated in the drawings. The slat cleaning apparatus is capable of other embodiments or of being practiced or carried out in other various ways. In the drawings.

DETAILED DESCRIPTION

Figure 13:
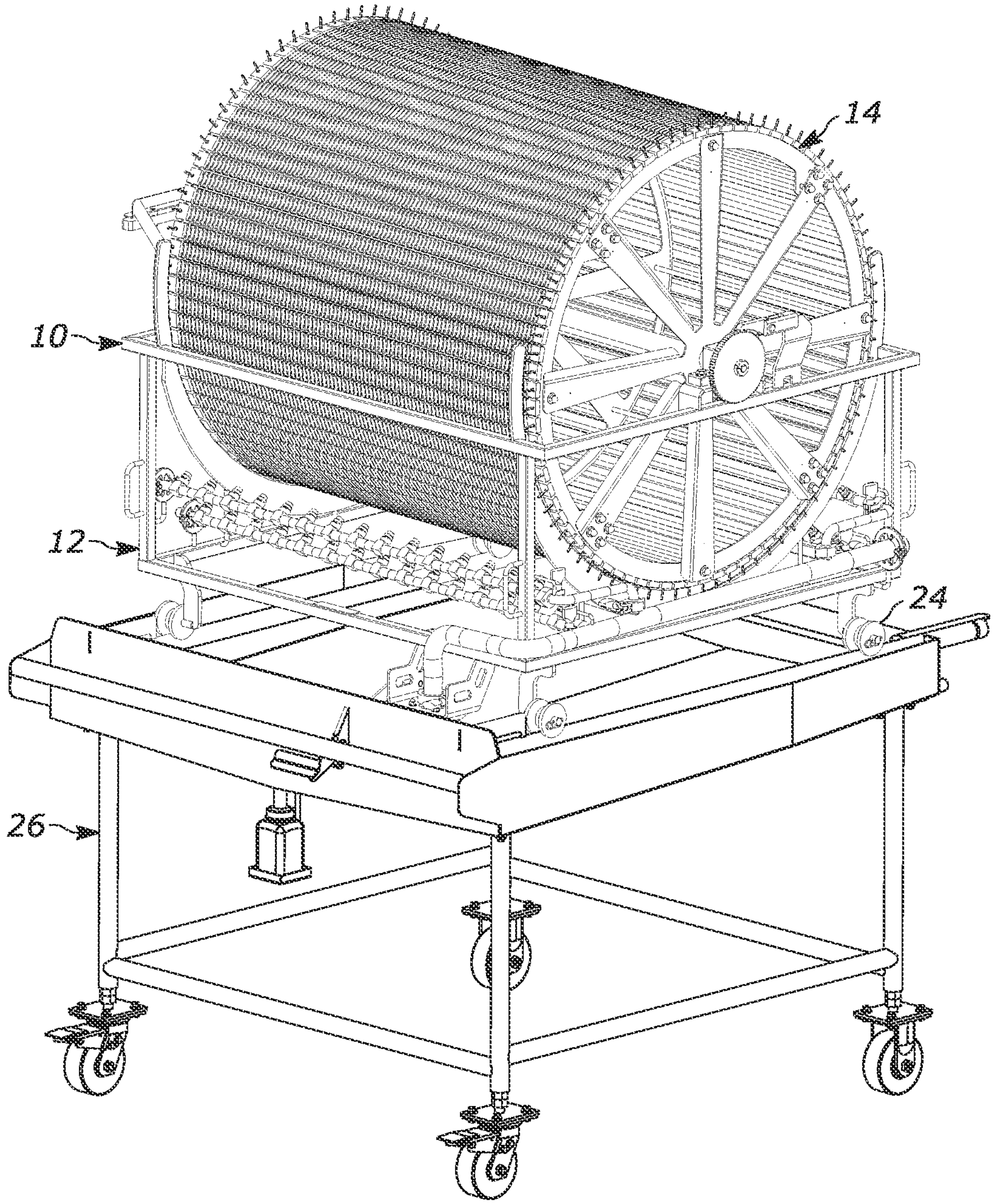
FIG. 13 is a perspective front view of the slat cleaning apparatus of FIG. 11 situated on a transport cart.

Referring to FIGS. 1-5 an embodiment of a slat cleaning apparatus 10 is shown in accordance with one exemplary embodiment. The slat cleaning apparatus 10 includes a rack frame 12 (also see FIGS. 6-7) and a rack carousel 14 (also see FIG. 8). The rack frame 12 includes a support base 20. The support base 20 can take many forms and still provide the functions described herein, such as rotatably supporting the carousel 14. In at least some embodiments, such as shown, the support base 20 includes a plurality of interconnected bars 22 forming a rectangular shape, although different shapes can be utilized, as well as elements other than bars, such as walls, etc. The rack frame 12 can further include a plurality of bottom rollers 24 for moving the slat cleaning apparatus 10 along a rail of a cart, such as shown in FIG. 13, illustrating an exemplary cart 26 for transporting the slat cleaning apparatus 10, wherein in at least some embodiments, the slat clearing apparatus 10 can be placed inside a cleaning cabinet (not shown) to contain overspray, control ambient temperature, control any chemical concentrations, protect operators during rotation and cleaning, provide consistent rotation and actuation, protect the cleaning apparatus and parts from outside contaminants, etc.

Figure 1:
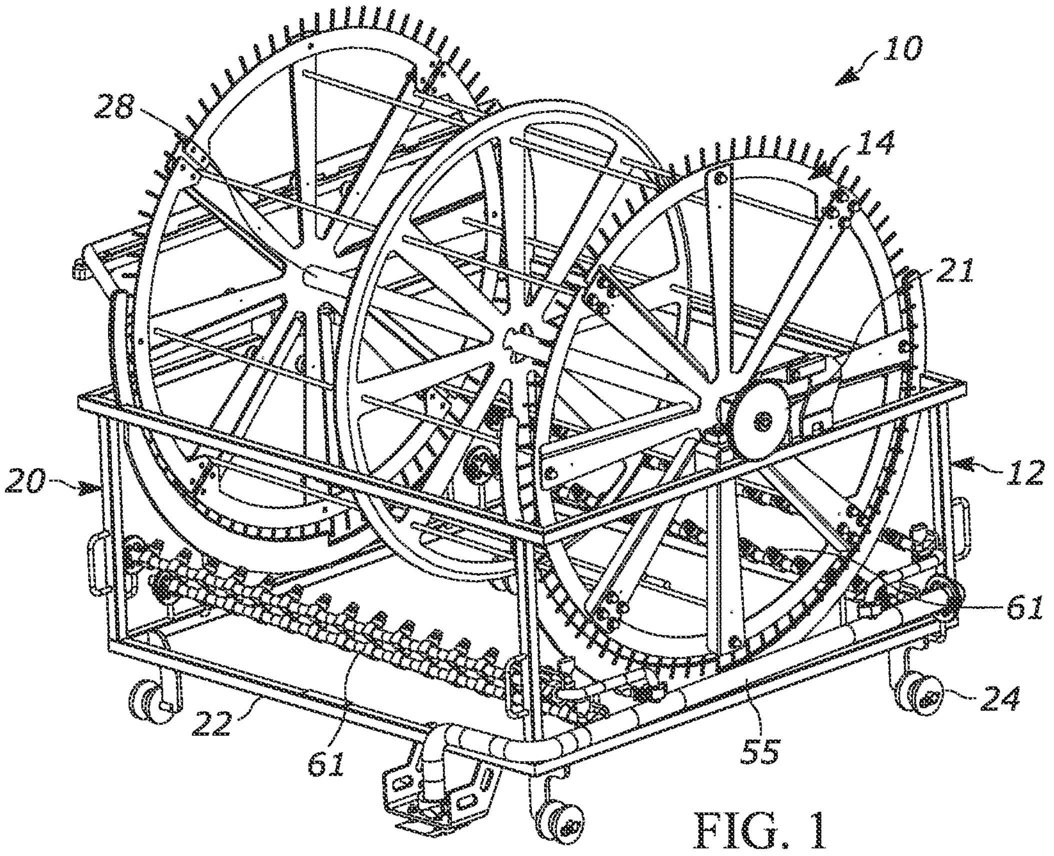
FIG. 1 is a front perspective top view of an exemplary embodiment of the slat cleaning apparatus.
Figure 2:
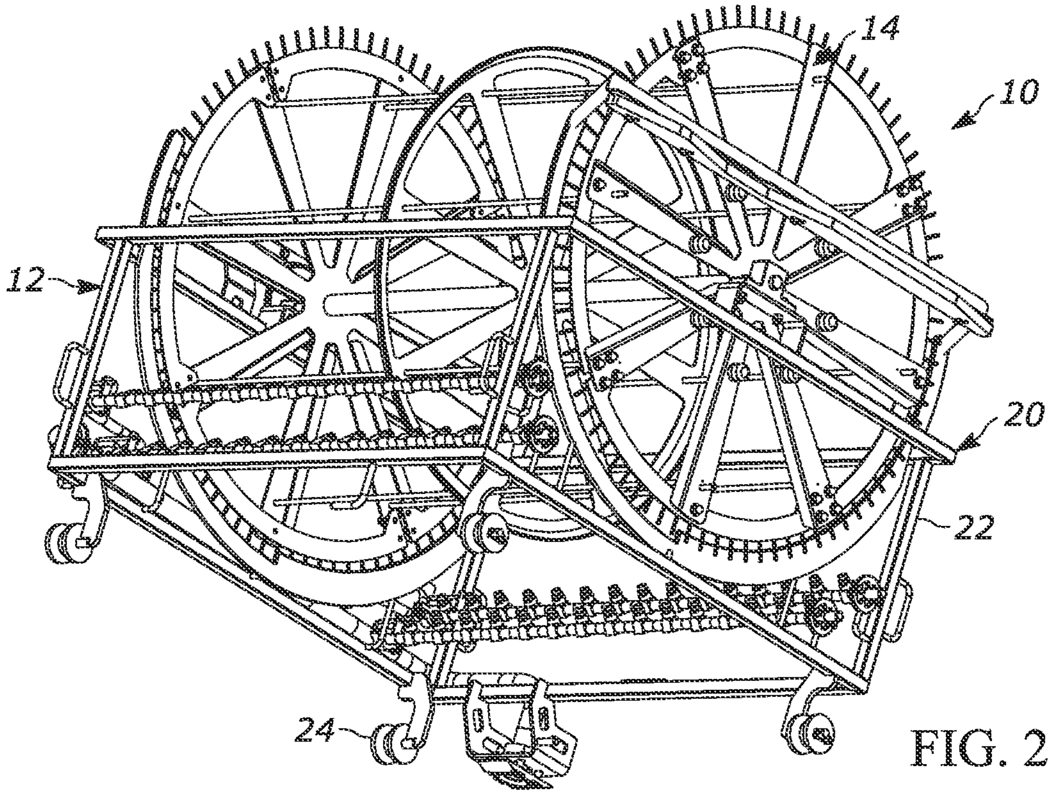
FIG. 2 is a rear perspective bottom view of the slat cleaning apparatus of FIG. 1.
Figure 3:
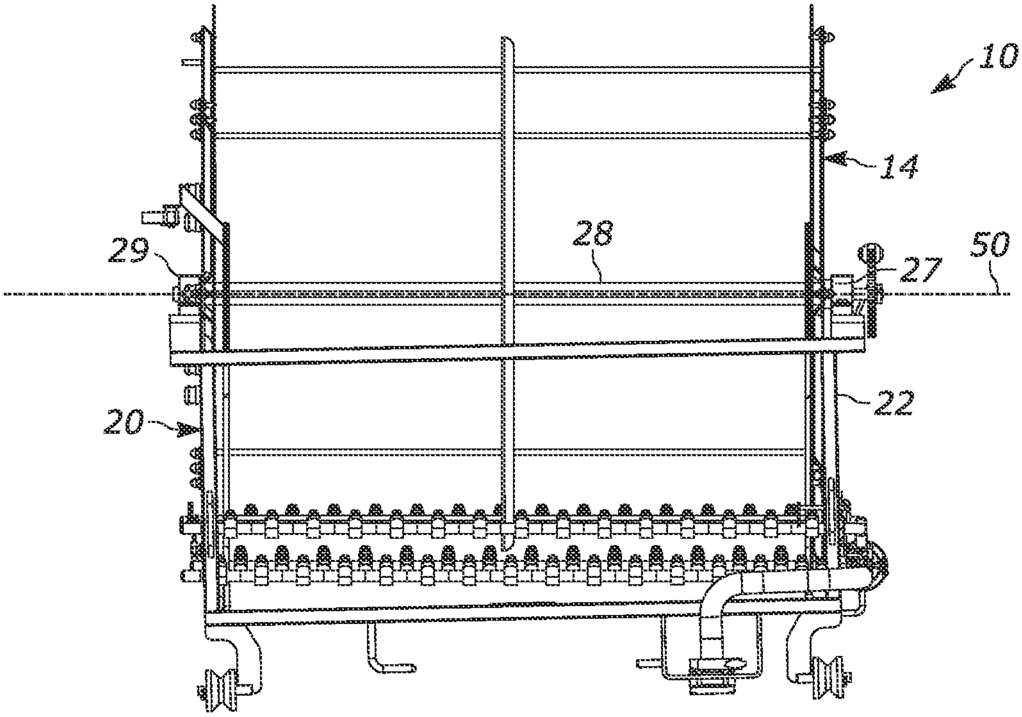
FIG. 3 is a front view of the slat cleaning apparatus of FIG. 1.
Figure 4:
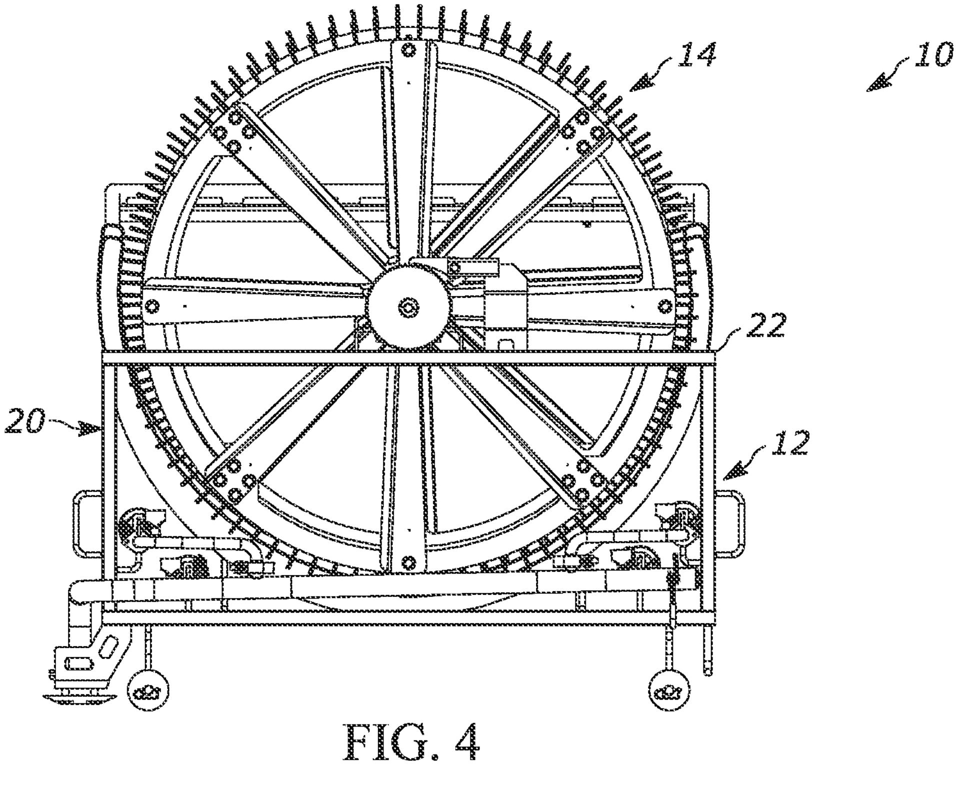
FIG. 4 is a right side view of the slat cleaning apparatus of FIG. 1.
Figure 5:
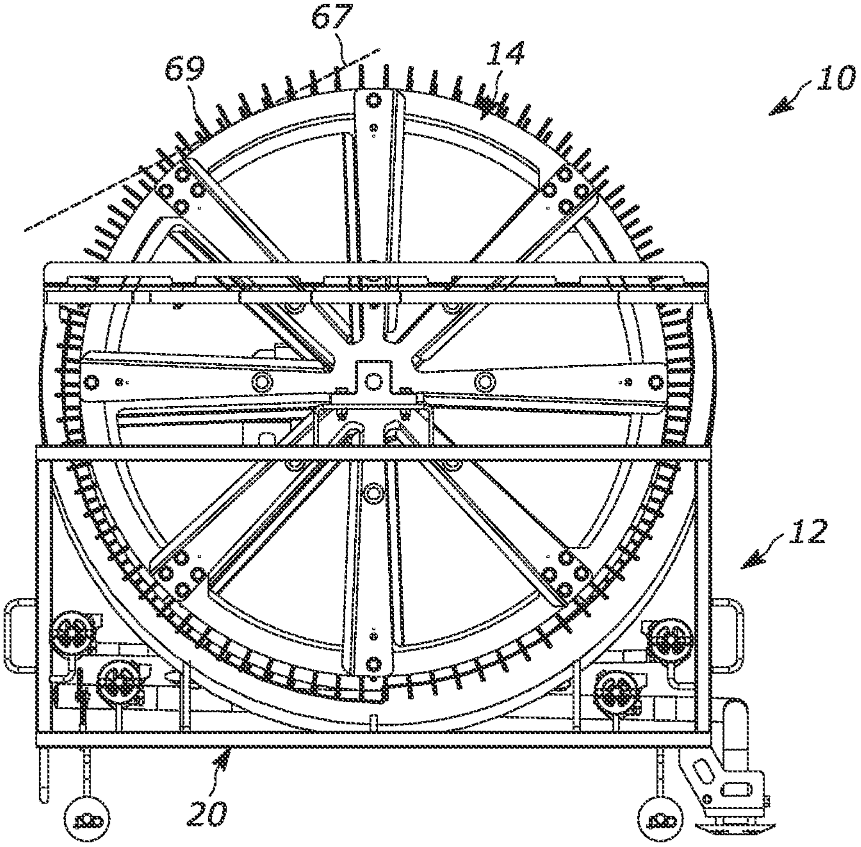
FIG. 5 is a left side view of the slat cleaning apparatus of FIG. 1.

The rack frame 12 also includes carousel mounts, such as first mount 27 and second mount 29 configured to support a carousel drive shaft 28. In at least some embodiments, the mounts 27, 29 are secured on top of the support base 20, while in other embodiments they can be lower. Further, in at least some embodiments, the second mount 29 is positioned vertically higher than the first mount 27 to provide a horizontal offset (tilt) to the carousel 14, as best seen in FIG. 3. The horizontal offset can assist with liquid drainage from the carousel 14 and matches the pitch of the piping.

Figure 6:
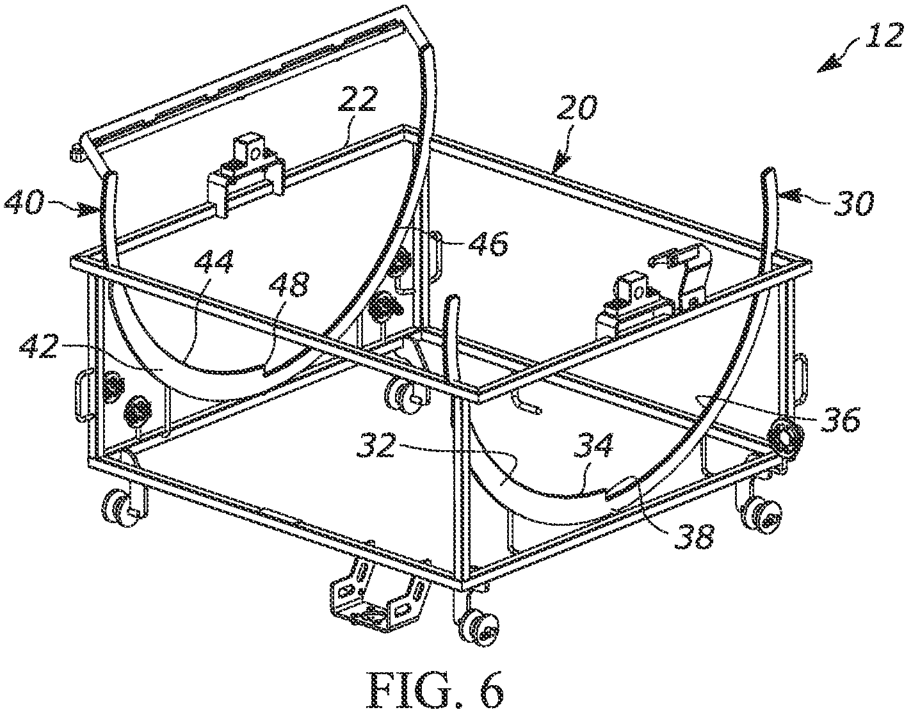
FIG. 6 is a front perspective view of the rack frame of the slat cleaning apparatus of FIG. 1.
Figure 7:
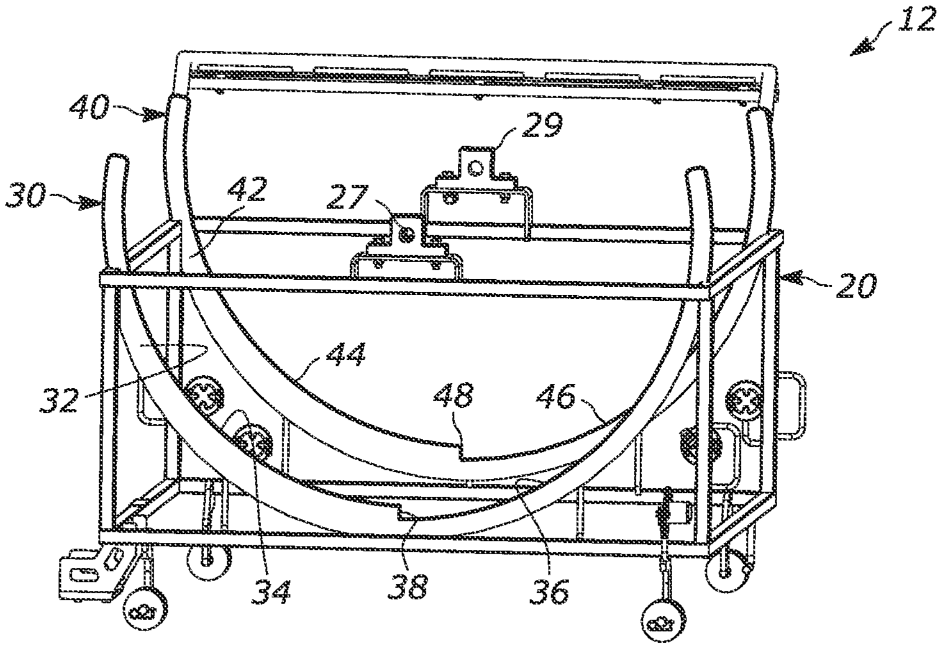
FIG. 7 is a right side view of the rack frame of FIG. 6.

Referring to FIGS. 6 and 7, the rack frame 12 further includes a first slat guide 30 having a curved first guide upper surface 32 extending along its length and providing a first upper track 34 and a first lower track 36, the first lower track 36 transitioning to the first upper track 34 via a first guide step 38. Also provided is a second slat guide 40 having a curved second guide upper surface 42 extending along its length and forming a second upper track 44 and a second lower track 46, the second lower track 46 transitioning to the second upper track 44 via a second guide step 48, wherein the first slat guide 30 and the second slat guide 40 are spaced apart and secured to the support base 20. In at least some embodiments, the first slat guide 30 and the second slat guide 40 are secured at opposite sides of the support base 20. The upper tracks 34, 44 curve upwards towards the front of the rack frame 12, and in at least some embodiments taper. The lower tracks 36, 46 curve upwards towards the rear of the rack frame 12, and in at least some embodiments do not taper. In at least some embodiments, the slat guides 30, 40 are identical in shape and size, while in other embodiments, they can vary. In at least some embodiments, one of the slat guides 30, 40 is vertically positioned lower than the other in order to account for the horizontal offset of the carousel 14, for example in the FIGS. the first slat guide 30 is shown lower. The slat guides 30, 40 in at least some embodiments, include a varied curvature, with the curvature varying not only between the upper tracks 34, 44 and lower tracks 36, 46, but within each of the upper and lower tracks themselves. The varied curvature allows for desired positioning of slats relative to the carousel 14 as they are rotated by the carousel 14. In at least some embodiments, the upper and lower tracks can be extended on either end to further encircle the carousel 14.

Figure 8:
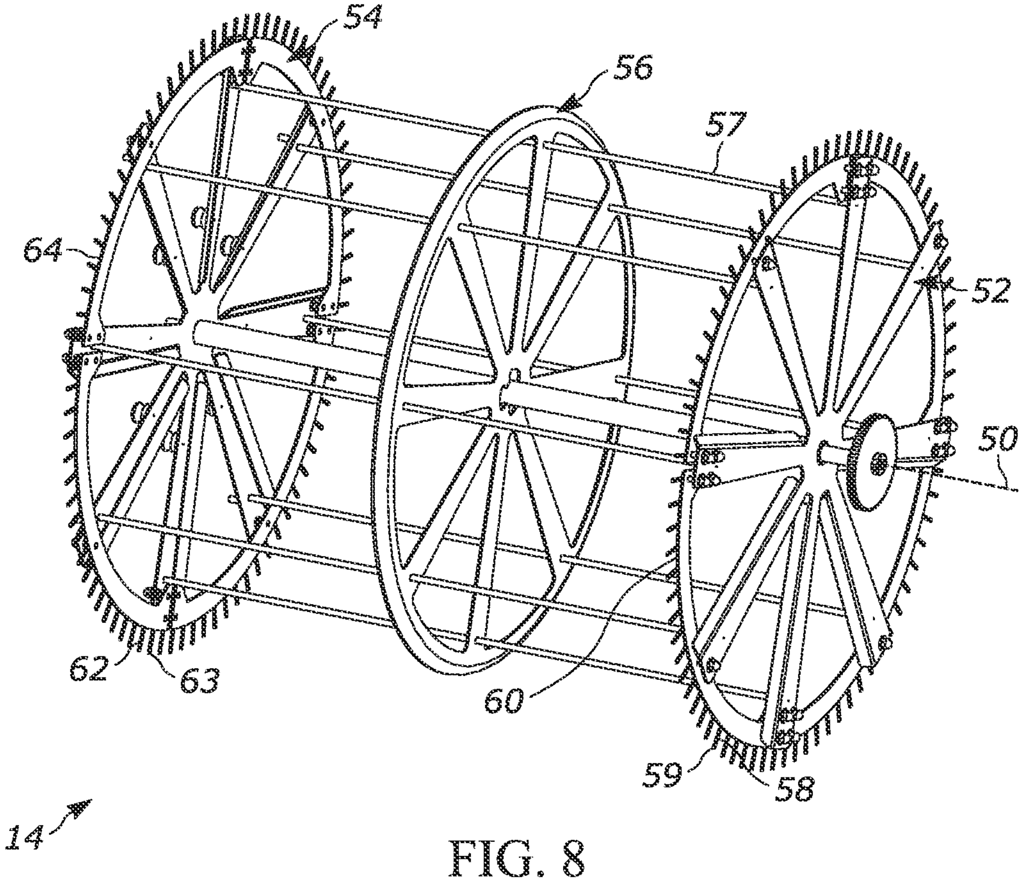
FIG. 8 is a front perspective view of the rack carousel of the slat cleaning apparatus of FIG. 1.

Referring to FIG. 8, an exemplary perspective front view of the carousel 14 is provided. In at least some embodiments, the carousel 14 includes a plurality of generally circular carousel plates aligned and secured together about a common central axis 50 extending through the carousel drive shaft 28, wherein the carousel plates are secured together to rotate simultaneously about the central axis 50. More particularly, as shown in exemplary FIG. 8, the carousel plates can in at least some embodiments include a first carousel plate 52, a second carousel plate 54, and a third carousel plate 56, although in other embodiments, more or less carousel plates can be utilized. The carousel plates can be integrally formed or include several separate stamped or molded components secured together. The carousel plates 52, 54, 56 can be secured to each other using various methods or components, for example as shown in FIG. 8, the carousel plates are secured together using a plurality of rods 57 extending perpendicularly therebetween. The carousel plates 52, 54, 56 can vary in diameter and thickness as desired.

The first and second carousel plates 52, 54 include a plurality of slat pins extending radially outward for slidable engagement with slats 70 (see FIGS. 9-10), whereas the third carousel plate 56 is provided as a support component for the first and second carousel plates 52, 54, although in some other embodiments, more or less carousel plates can be provided, with or without slat pins. For example, the first carousel plate 52 can include a plurality of first slat pins 58 having first slat pin ends 59 and extending radially outward from a first outer rim surface 60, and the second carousel plate 54 can include a plurality of second slat pins 62 having second slat pin ends 63 and extending radially outward from a second outer rim surface 64. The slat pins 58 and 62 are positioned around the circumference of the outer rim surfaces 60, 64 and spaced to accommodate the thickness of the slats 70, such that slats 70 are sufficiently spaced apart from each other to allow separate movement, as such the spacing can vary as necessary. The slat pins can take many forms, being round or square in cross-section for example, and include various lengths and thickness to accommodate various slats. In at least some embodiments, the slat pins 62 extend perpendicularly relative to a tangent along the outer rim surfaces 60, 64 to which they respectively extend (for example, see tangent 67 and slat pin 69 shown in FIG. 5), while in other embodiments the slat pins 62 can extend radially at different angles.

Figure 9:
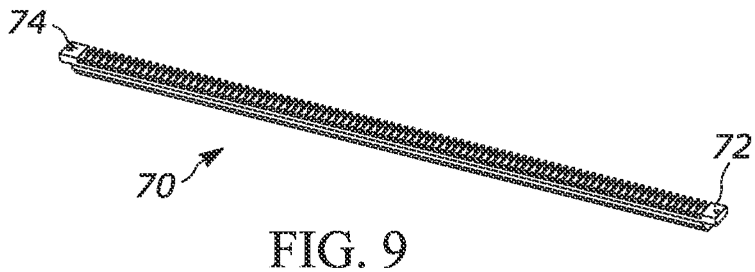
FIG. 9 is a perspective top view of an exemplary pill slat.
Figure 10:
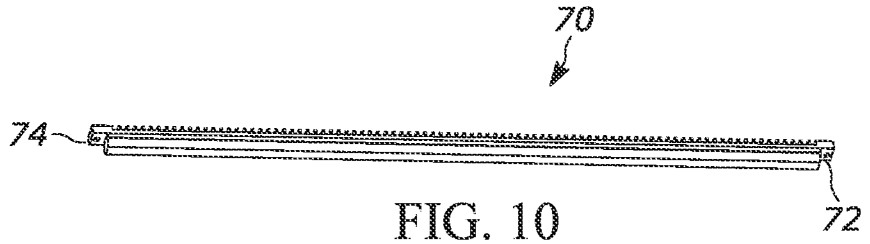
FIG. 10 is a perspective bottom view of the pill slat of FIG. 9.
Figure 11:
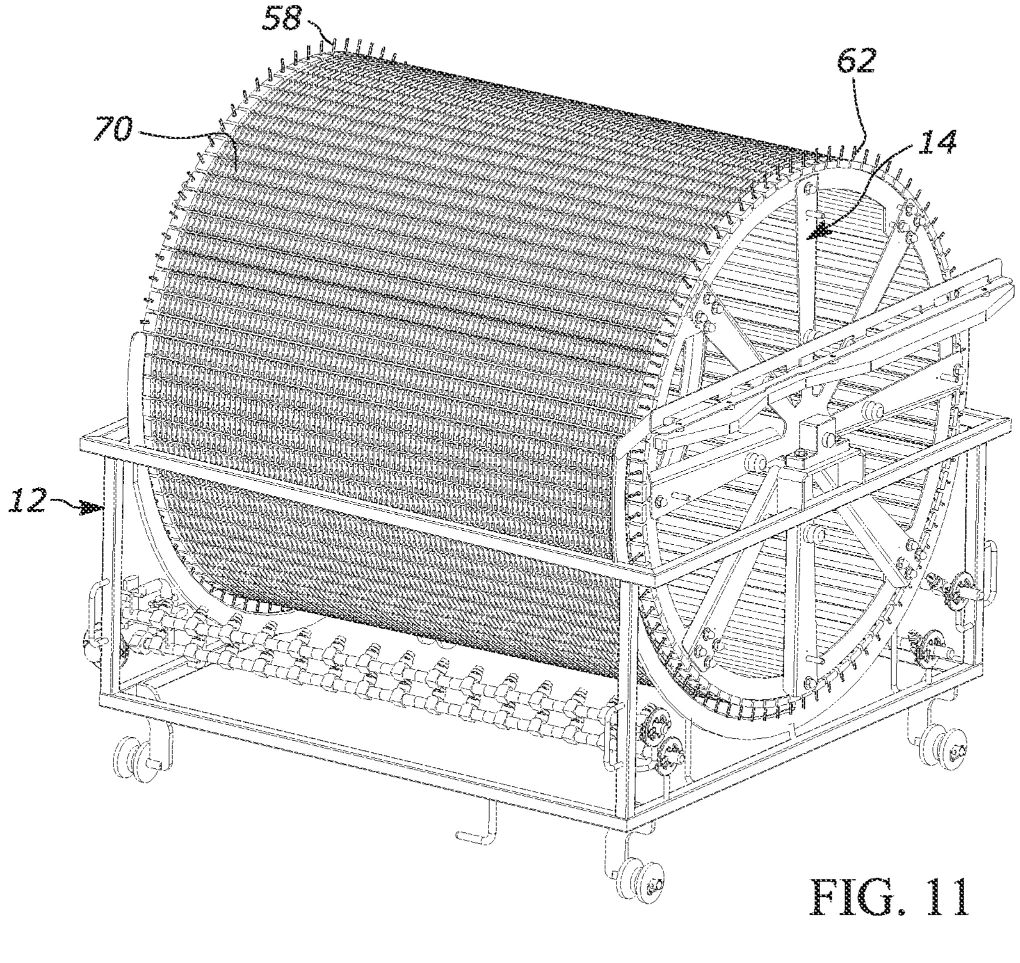
FIG. 11 is a rear perspective view of the slat cleaning apparatus of FIG. 1 with a plurality of pill slats coupled therewith.
Figure 12:
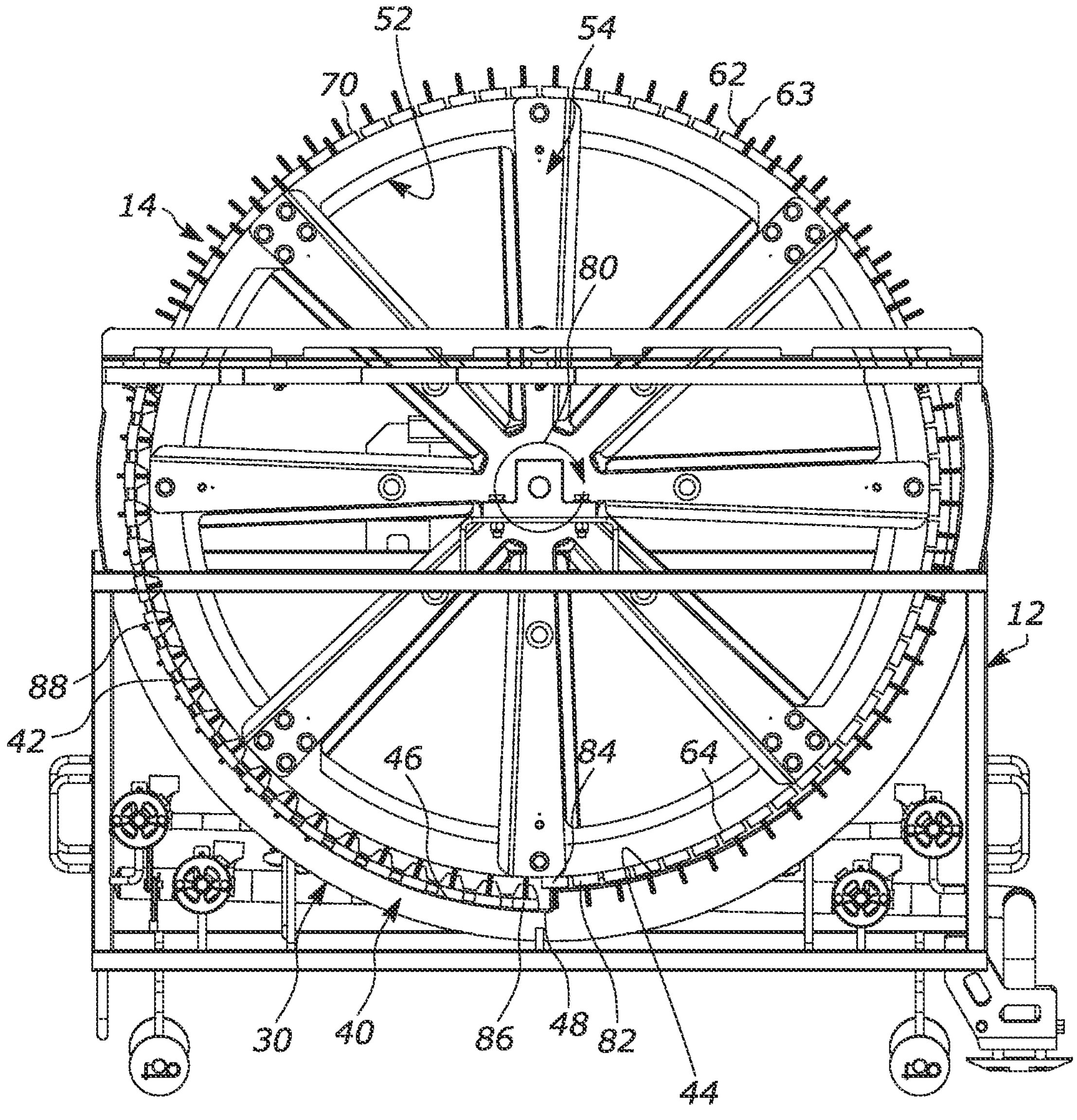
FIG. 12 is a side view of the slat cleaning apparatus of FIG. 11.

Slats 70 can be formed in various shapes and sizes and are generally used by production facilities to manufacture or dispense products, for example dispensing pills into bottles. As seen in FIGS. 9 and 10 providing perspective views of an exemplary slat used for pill dispensing, slats 70 can include slat apertures on their ends, such as first slat aperture 72 and second slat aperture 74. The slat pins are sized and shaped to slidably receive the slat apertures. FIGS. 11, 12, and 13 show the slat cleaning apparatus 10 with the slats 70 positioned therearound with each of the respective slat apertures slidably engaged with respective slat pins to position the slats parallel with the central axis 50, although other orientations can be utilized using different slat pin positioning.

Referring further to FIG. 12, a side view of the slat cleaning apparatus 10 with the slats 70 is provided, showing the specific engagement of the slats 70 with the slat pins 58, 62, the outer rim surfaces 60, 64, and the slat guides 30, 40. As can be seen in FIG. 12, as the carousel 14 is rotated clockwise (see rotational arrow 80) relative to the rack frame 12, the guide upper surfaces 32, 42 of the slat guides 30, 40 serve to provide support and positioning of the slats 70 relative to the slat pins 58, 62. As the slats 70 rotate with the carousel 14, during a down-stroke, gravity would generally cause the slats to slide outwards along the slat pins (away from the outer rim surfaces and towards the slat pin ends), and absent the slat guides, the slats would fall off the carousel 14. For various reasons, such as size, in at least some embodiments, additional slat guides can be provided on the rack frame 12 as desired to accommodate longer or heavier slats for example (also with associated additional slat pins).

The guide upper surfaces 32, 42 are shaped to provide several functions. More particularly, the first and second upper tracks 34, 44 are positioned to keep the slats 70 close to or in abutment with the outer rim surfaces 60, 64 as the slats 70 are rotated downward (down-stroke), while the first and second lower tracks 36, 46 are positioned to lift the slats 70 back upwards from a dropped position adjacent the first and second slat pin ends 59, 63 and towards the outer rim surfaces 60, 64. The first guide step 38 and second guide step 48 are situated about the bottoms of their respective slat guides 30, 40 and provide a vertical drop for the slats 70. More particularly, as the slats 70 are rotated by the carousel 14, they will abruptly fall off (downward) the first and second upper tracks 34, 44 when they reach the first and second guide steps 38, 48 and abruptly land on the first and second lower tracks 36, 46. The force of the falling slats 70 abruptly striking the first and second lower tracks 36, 46 causes liquid that is clinging to the slats 70 to break free from and fall off, resulting in a removal of residual liquid from the slats 70 that does not occur by merely rotating the slats 70 (due to surface tension of the liquid, small pockets or crevices, etc.). The guide step height (difference between the vertical height of the first and second upper tracks 34, 44 and the first and second lower tracks 36, 46 adjacent the guide steps 38, 48) can vary depending on the desired strike force needed to sufficiently dislodge liquid from the slats 70, with slat pins 58, 62 being lengthened or shortened to accommodate the modified guide step height.

Figure 14:
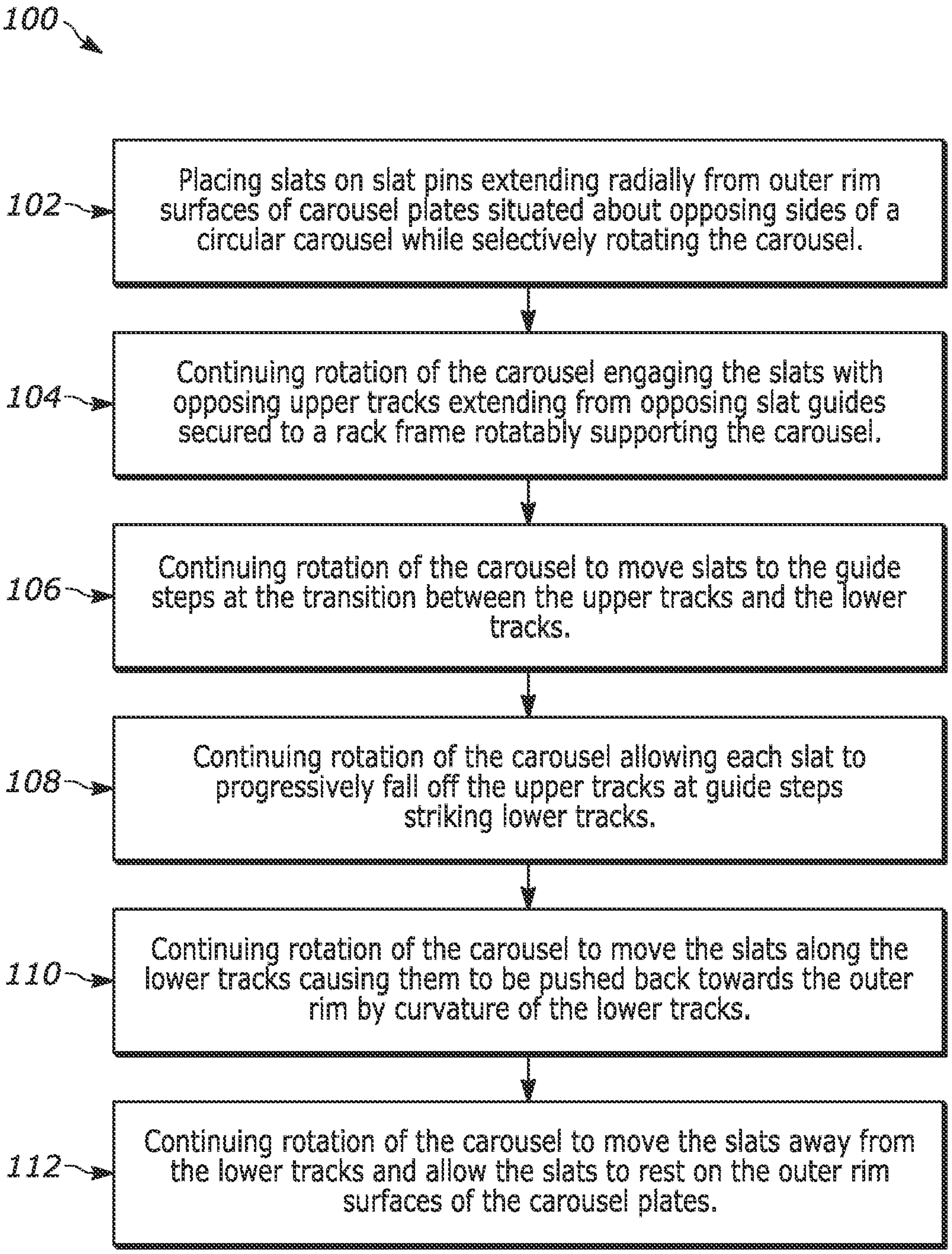
FIG. 14 is a flow chart illustrating a method of removing residual liquid.

To further illustrate the process of removing residual liquid from the slats provided by the structure discussed above, exemplary steps of the process are discussed below and illustrated in flow chart 100 of FIG. 14. For illustrative purposes, several slats 70 shall be numerically referenced based on varying positions along the carousel 14, namely a first slat position 82, a second slat position 84, a third slat position 86, and a fourth slat position 88 (see FIG. 12). In a first step 102 the slats 70 are placed on the slat pins (opposite slat pins that are parallel relative to the central axis 50) while the carousel 14 is selectively rotated either manually or using a motor/drive interconnected with the carousel drive shaft 28 or another component or portion of the carousel 14. Such interconnection and selective rotation can be accomplished using any of various known methods, such as direct drive, belt/gear drive, PLC's, and manual switches and sensors, and shall be understood as within the knowledge of a person of ordinary skill in the art and therefore not described in detail herein. Further, in at least some embodiments, an indexing component 21 can be provided that serves as an anti-reverse mechanism to hold the carousel 14 position during operation or loading, this component can include any of various component configurations known in the art to prevent an object from reversing in a rotational direction. As the slats 70 are rotated downward by the carousel 14 in step 104 they engage the upper tracks, which maintain (or move if necessary) the slats adjacent to the outer rim surfaces, as shown by first slat position 82, continued rotation of the carousel 14 in step 106 moves the slat to the second slat position 84 at the transition between the first and second upper tracks 34, 44 and the first and second lower tracks 36, 46, namely the guide steps 38 and 48. At step 108, rotation of the carousel 14 is continued allowing the slat to fall off the upper tracks and strike the lower tracks, as shown in slat position 86. In step 110, continued rotation of the carousel 14 moves the slats along the lower tracks which are curved to move/push the slats (sliding along the slat pins) back towards the outer rim surfaces 60, 64. In step 112, continued rotation of the carousel 14 moves the slats away from the lower track, and via gravity, the slats rest on the outer rim surfaces of the carousel plates 52, 54. The aforementioned process can include more steps or less steps than provided. As the typical wash, rinse, sanitize, and drying cycles used in various CIP processes that utilize spraying liquids or air onto components are well known and therefore not detailed herein, it shall be understood that the aforementioned process can take place during any one or more of these various stages of a CIP cycle.

Further, as shown, the slat cleaning apparatus 10 can include various pipes (e.g., pipe 55), manifolds, valves, and nozzles (e.g., nozzles 61) for use in selectively passing liquids or air for cleaning and sanitation. As the use of these elements alone in various configurations are well known in CIP applications, they have not been described in detail here. Although, it shall be understood that such components can vary in configuration from the FIGS. and be utilized to provide the desired cleaning, sanitizing, and drying cycles for slats mounted on the slat cleaning apparatus 10. In addition, with regard to methods of operation, it shall be understood it is within the knowledge of a person skilled in the art to program a machine controller to activate motors, valves, etc. as desired, such as rotating the carousel at a desired speed or to a desired position, opening liquid valves, monitoring temperature sensors, running cycle timers, etc.

Various aspects of the slat cleaning apparatus can be modified within the spirit of the invention. In addition to the disclosed shapes and sizes (e.g., cylindrical, tubular, square, tapered, curved, etc.), all the aforementioned components, can vary to include numerous adaptations. Further, the material composition of all components can also include numerous elements, such as steel, aluminum, alloys, plastics, etc. Although various components may be shown and described in pairs, it is to be understood that a plurality of such components can be utilized to perform the same or similar function as disclosed herein, and the use of the term "plurality" in the description or claims shall be understood to include "one or more."

While the invention is particularly useful as part of a CIP system other applications are possible and references to use in a CIP system should not be deemed to limit the application of the invention. Rather, the invention may be advantageously adapted for use where similar performance capabilities and characteristics are desired, and that such modifications may be made by one of skill in the art of the invention without departing from the spirit or intent of the invention and therefore, the invention is to be taken as including all reasonable equivalents to the subject matter.

What is claimed is:

1. A slat cleaning apparatus comprising:
a rack frame comprising:
- a support base;
- a first slat guide having a curved first guide upper surface forming a first upper track and a first lower track, the first lower track transitioning to the first upper track via a first guide step; and
- a second slat guide having a curved second guide upper surface forming a second upper track and a second lower track, the second lower track transitioning to the second upper track via a second guide step, wherein the first slat guide and the second slat guide are spaced apart and secured to the support base; and a rack carousel comprising:

a plurality of circular carousel plates aligned and secured together about a common axis extending through a carousel drive shaft, wherein the carousel drive shaft is coupled to the support base to allow the plurality of circular carousel plates to rotate about the common axis relative to the support base, wherein the plurality of circular carousel plates includes at least a first carousel plate and a second carousel plate;

a plurality of first slat pins extending radially outward from a first outer rim surface of the first carousel plate; and a plurality of second slat pins extending radially outward from a second outer rim surface of the second carousel plate.

2. The apparatus of claim 1, wherein the plurality of first slat pins are positioned to slidably receive a first slat aperture of a removable slat and the plurality of second slat pins are positioned to slidably receive a second slat aperture of the removable slat.

3. The apparatus of claim 2, wherein the plurality of first slat pins have a length that is greater than a thickness of the removable slat at the first slat aperture, to allow the removable slat to slide between the first outer rim surface and first slat pin ends.

4. The apparatus of claim 1, wherein the plurality of first slat pins and second slat pins extend perpendicularly relative to a tangent along the outer rim surface to which they respectively extend.

5. The apparatus of claim 4, wherein the rack frame further includes a first mount and a second mount, both secured to the support base and coupled to the carousel drive shaft, wherein one of the first mount and second mount are situated vertically higher than the other of the first mount and second mount, such that the carousel is horizontally offset.

6. The apparatus of claim 5, wherein one of the first slat guide and second slat guide is situated vertically lower than the other of the first slat guide and second slat guide, to accommodate the horizontal offset of the carousel.

7. The apparatus of claim 6, further including a plurality of pipes and nozzles for delivering and directing wash liquid towards the carousel.

8. The apparatus of claim 7, wherein the plurality of circular carousel plates further includes a third carousel plate situated between the first carousel plate and the second carousel plate.

9. The apparatus of claim 8, wherein the first carousel plate, the second carousel plate, and the third carousel plate are secured together using a plurality of rods extending perpendicularly therebetween.

10. A slat cleaning apparatus comprising:

a rack frame comprising:

a support base;

a first slat guide having a first upper track and a first lower track, the first lower track transitioning to the first upper track via a first guide step; and a second slat guide having a second upper track and a second lower track, the second lower track transitioning to the second upper track via a second guide step, wherein the first slat guide and the second slat guide are spaced apart and secured to the support base; and a rack carousel comprising:

a plurality of carousel plates aligned and secured together about a common axis extending through a carousel drive shaft, wherein the rack carousel is coupled to the support base to allow the plurality of carousel plates to rotate about the common axis relative to the support base;

a plurality of first slat pins extending radially outward from a first outer rim surface of a first carousel plate of the plurality of carousel plates; and a plurality of second slat pins extending radially outward from a second outer rim surface of a second carousel plate of the plurality of carousel plates.

11. A method of removing residual liquid with a slat cleaning apparatus, comprising:

providing a slat cleaning apparatus comprising:

a rack frame comprising:

a support base;

a first slat guide having a first upper track and a first lower track, the first lower track transitioning to the first upper track via a first guide step; and a second slat guide having a second upper track and a second lower track, the second lower track transitioning to the second upper track via a second guide step, wherein the first slat guide and the second slat guide are spaced apart and secured to the support base; and a rack carousel comprising:

a plurality of carousel plates aligned and secured together about a common axis extending through a carousel drive shaft, wherein the rack carousel is coupled to the support base to allow the plurality of carousel plates to rotate about the common axis relative to the support base;

a plurality of first slat pins extending radially outward from a first outer rim surface of a first carousel plate of the plurality of carousel plates; and a plurality of second slat pins extending radially outward from a second outer rim surface of a second carousel plate of the plurality of carousel plates;

placing a plurality of first slats and a plurality of second slats on the plurality of first slat pins and the plurality of second slat pins respectively while selectively rotating the carousel;

continuing rotation of the carousel engaging at least one of the plurality of first slats and the plurality of second slats with at least one of the first upper track and the second upper track;

continuing rotation of the carousel allowing each slat to progressively fall off the first and/or second upper tracks at the first guide step and/or the second guide step striking at least one of the first lower track and the second lower track;

continuing rotation of the carousel to move the slats along the first and second lower tracks causing them to be pushed back towards an outer rim by curvature of the first and second lower tracks; and continuing rotation of the carousel to move the slats away from the first and second lower tracks and allow the slats to rest on at least one of the first outer rim surface and the second outer rim surface of the first and second carousel plates.

* * * * *